July 7, 1953 R. W. EYCLESHIMER 2,644,180
PLATFORM RAMP
Filed Feb. 25, 1949 2 Sheets-Sheet 2
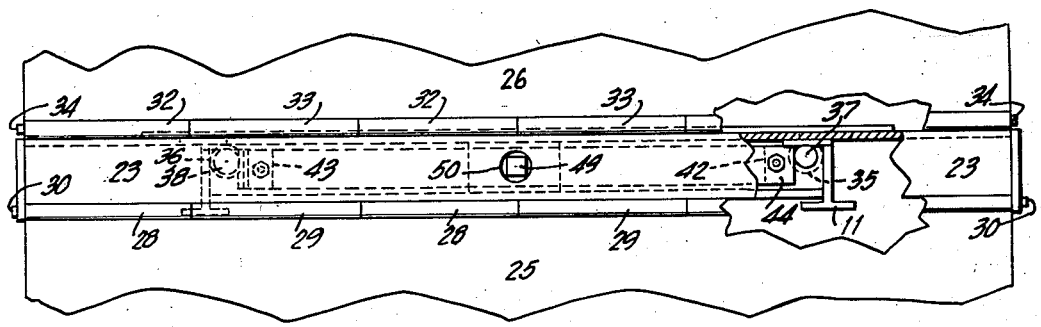
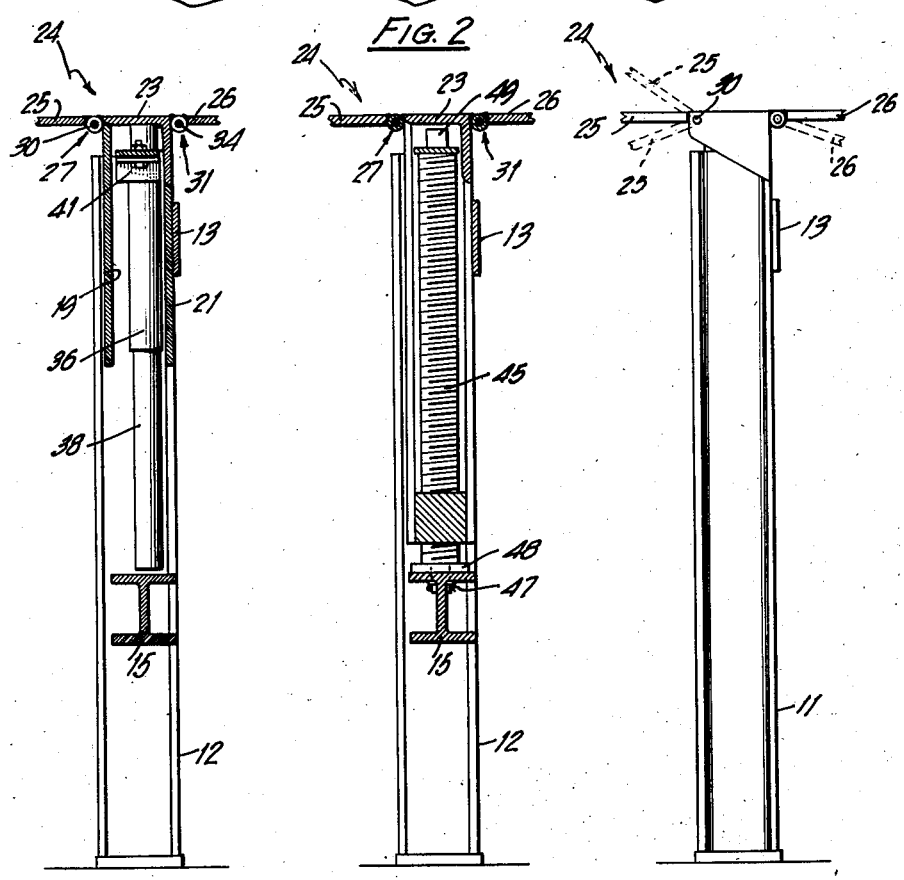
Fig. 3  Fig. 4  Fig. 5
Inventor
Ralph W. Eycleshimer
by
His Attorneys Patented July 7, 1953

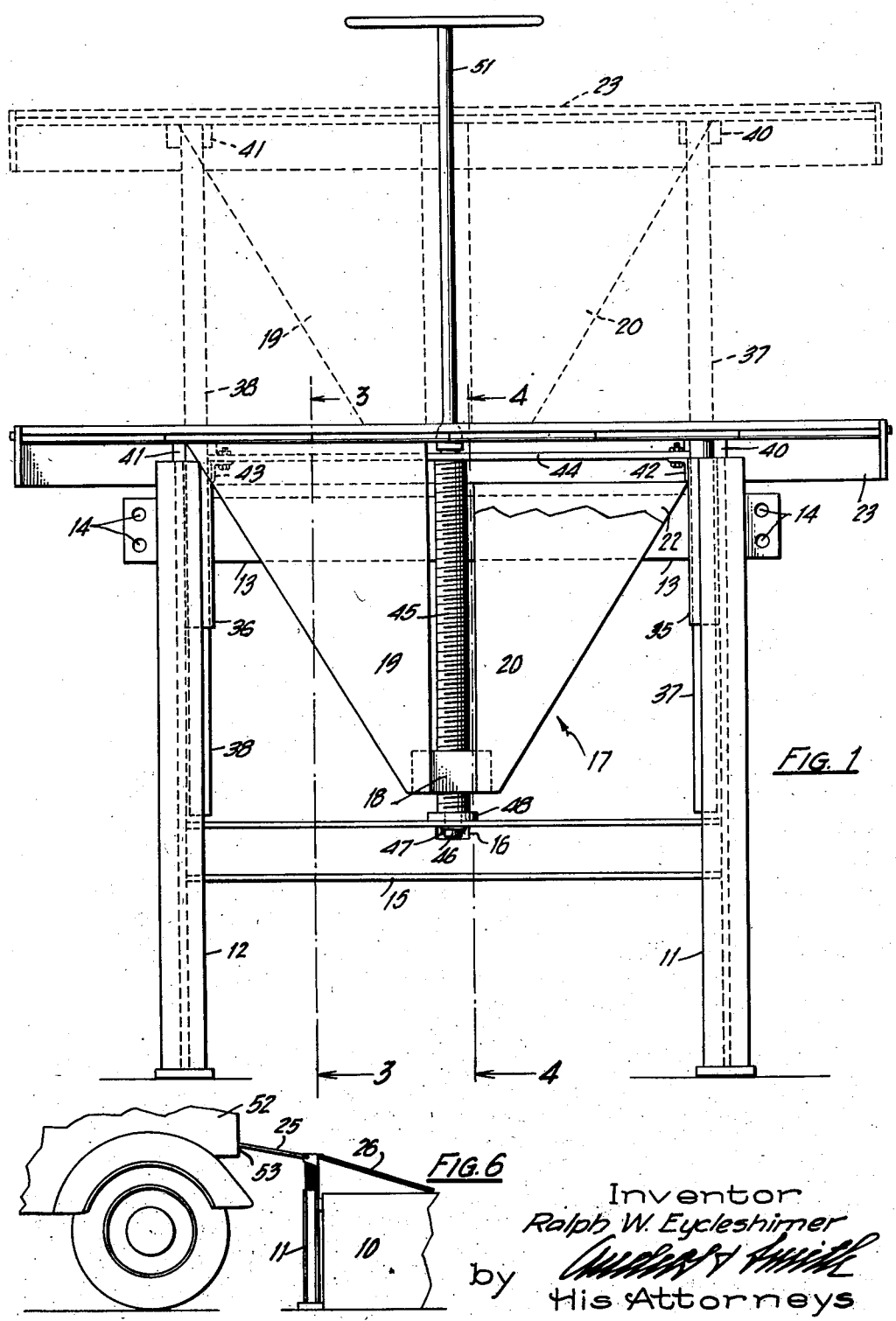

2,644,180

UNITED STATES PATENT OFFICE 2,644,180

PLATFORM RAMP

Ralph W. Eycleshimer, Troy, N. Y., assignor to Beaunit Mills, Inc., New York, N. Y., a corporation of New York Application February 25, 1949, Serial No. 78,439

5 Claims. (Cl. 14—72)

This invention has to do with platform ramps and, more particularly, an adjustable type of platform ramp for loading and unloading trucks whose floor levels vary in height with respect to said platform.

Unloading and loading platforms at freight stations, or the like, are of a fixed height. Transport and other trucks of different capacities are backed up toward the end of the platform for loading and unloading purposes. However, the floor levels of different size trucks are not always of the same height as the platform. Many of them extend high above the platform and others extend far below the platform. Floor plates or movable bridges are often used to span the distance between the floor of the truck and the platform for loading and unloading the trucks when the same are not backed up against the end of the platform as is customary when the platform and truck floors are on the same level. Such devices are often cumbersome to handle or are easily shifted out of position during the process of loading and unloading the trucks and this causes loss of time and promotes lack of efficiency during such operations.

It would be a distinct advantage to overcome the foregoing difficulties and objections and this is accomplished by means of the present invention.

Generally, therefore, it is an object of the invention to provide such an adjustable platform ramp having means for supporting the ramp in an elevated position adjacent the edge of the platform to bridge the gap between the latter and the floors of trucks, and a mechanism for raising and lowering the ramp to a position above and below the platform in order that trucks, whose floor levels are either above or below the platform, readily and easily can be loaded and unloaded.

More specifically, it is an object of the invention to provide a platform ramp utilizing a jack supported adjacent the end of the platform with means, carried by the jack and supporting the ramp, adapted to be raised and lowered with respect to the level of the platform, the ramp constituting a platform section adapted to overlie the platform and to be raised above and lowered to the level thereof, and a truck section cooperatively associated with the platform section adapted to extend into trucks and be supported by the floors thereof, the truck section being adapted to be raised and lowered above and below the level of the platform to accommodate trucks whose floors are also above or below the level of the platform.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawing, in which:

Fig. 1 is a front elevational view of an adjustable loading and unloading ramp, with a portion thereof broken away, and showing the ramp raised in elevated dotted line position;

Fig. 2 is a plan view of the apparatus depicted in Fig. 1 with parts thereof broken away, and a portion thereof in section;

Fig. 3 is a sectional view taken along the lines 3—3 of Fig. 1 and looking in the direction of the arrows;

Fig. 4 is a sectional view taken along the lines 4—4 of Fig. 1 and looking in the direction of the arrows;

Fig. 5 is an end elevational view of Fig. 1; and

Fig. 6 is a view illustrating an adjustable ramp embodied by the invention in an operable position at the end of a loading platform and bridging the gap between the floor of a truck body and the platform.

Referring more particularly to the drawings, there is illustrated a ramp and cooperating structure for raising and lowering the same secured to a loading and unloading platform 10. Preferably, there is utilized, as a supporting structure, two spaced apart I beams 11 and 12 which are held in an upright position by a flat plate or beam 13 welded thereto adjacent the tops thereof, and which has suitable holes 14 drilled in its ends for securing the same against the end of the platform. Another I beam 15 is welded, or secured in any other suitable manner, between the I beams 11 and 12 toward the bottoms thereof.

The I beam 15 has a cutout portion 16 centrally located to receive the end portion or shank of a screw jack arrangement indicated generally at 17. The screw jack is the preferred construction for raising and lowering the ramp but it will be understood that other suitable means equivalent thereto may be employed if adapted to structure embodying the invention.

The screw jack arrangement includes a large rectangular type of threaded nut or block 18, which constitutes a lower portion of the ramp structure mounted on the screw of the jack and to this there are welded two pairs of oppositely disposed plates 19, 20, and 21 and 22. These plates are generally similar in configuration, but plates 19 and 20 are of somewhat greater length than the plates 21 and 22. All of the plates are connected across their top edges, also preferably by means of welding, to an elongated angle iron, or cross head, 23. The tops of the plates 19 and 20 are secured to the marginal edge of the horizontal portion of the angle iron 23 and therefore must be longer than the plates 21 and 22. The latter are secured to the bottom edge of the vertical portion of the angle iron 23 and are therefore shorter in length.

The ramp, indicated generally at 24, is preferably hinged to the angle iron, or cross head, 23 and constitutes two plates, or wings, namely, 25 and 26. It should be noted that the cross head 23 is part of the ramp and constitutes an upper portion of the ramp structure. The plate 25 is hingedly secured to the edge of the horizontal portion of the angle iron, or cross head, 23 by means of a heavy tubular element or pipe, indicated generally at 27, welded to both these members. It will be observed that this pipe is cut or separated into sections so that alternate parts, 28 and 29, interfittingly are arranged and welded to the cross head 23 and the plate 25 respectively. Passing through these pipe sections is a hinge pin 30.

The plate 25 more conveniently can be referred to as the truck section since it is adapted to extend into trucks and be supported by the floors thereof. It is adapted to be raised above the level, as well as below the level, of the platform 10 to accommodate trucks whose floors are above or below the level of the platform.

The wing, or plate 26, is similar in configuration to plate 25 and is also secured to the angle iron, or cross head, 23, by means of a heavy pipe 31 welded thereto, which in turn is welded to the cross head 23. This pipe is also alternately sectioned as at 32 and 33, so as interfittingly to be secured together. Passing through the pipe sections 32 and 33 is a hinge pin 34. This section of the ramp may more conveniently be referred to as the platform section because it is adapted to overlie the platform 10 and to be raised and lowered with respect thereto in a manner somewhat different from the plate 25 which is adapted to be lowered below the level of the platform 10 as above pointed out.

Secured to the top of the standards 11 and 12 are two steel tubes 35 and 36. These preferably also are welded in position and function as guide means for raising and lowering the structure which carries the ramp. To this end there is secured to the bottom of the cross head two guide shafts 37 and 38 passing through the tubes 35 and 36 respectively. Preferably, the shafts 37 and 38 also are welded in position and extend downwardly through the tubes 35 and 36 to a point short of the top of the I beam 15 when the ramp is in its lowermost position. In order to bring the shafts in alignment with the tubes, they are spaced from the vertical portion of the angle iron, or cross head 23, by filler pieces 40 and 41 to which they also preferably are welded.

Welded to the top of the tube 35 is a small angle iron 42. A similar angle iron 43 is welded to the top of the tube 36. Across the top of the angle irons, there is secured a bridging piece 44. This bridging piece has an opening at its top to accommodate the top of the screw 45 of the screw jack. The bottom of the screw has a shank 46 which extends into the opening 16 in the I beam 15. The screw is there held in rotatable position by means of a cotter pin 47 underneath the top horizontal portion of the beam 15. At the end of the screw 45 on top of the beam 15 is a thrust bearing 48 to carry the load imposed on the screw jack through the nut 18, plates 19 through 22 and the ramp 24. At the top of the screw 45, the shank passes through an opening in the bridging piece 44 and this shank 49 is square in cross section. Immediately above the square shank is an opening 50 in the cross head 23 whereby to accommodate a wrench 51 having a socket which will fit the square shank 49 of the threaded screw 45 of the jack so that the ramp can be raised or lowered.

In operation, the device is very simple and efficient. Assume, for example, that a truck 52, whose floor level 53 is higher than that of the platform 10, is backed up in spaced position with respect to the end of the platform. The truck section 25 of the ramp 24 is rested upon the floor of the truck and the handle 51 is utilized to raise or lower the entire device so that the section 25 and the platform section 26 will provide a suitable runway. It will be observed that the platform section 26 of the ramp will only be raised as illustrated in the drawing, or lowered to rest on the platform; but that the truck section 25 of the ramp will not only be raised as shown in Fig. 6 but, as indicated in dotted line position in Fig. 5, can be dropped down to the floor level of a truck which is below the level of the platform. Obviously, the sections 25 and 26 can have their surfaces roughened or ribbed to provide gripping or non-skidding areas especially for the accommodation of hand trucks or the like for loading and unloading purposes.

It will thus be seen that the objects hereinbefore set forth can readily and efficiently be attained, and since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new, and desire to acquire by Letters Patent is:

1. An adjustable ramp apparatus for loading and unloading trucks whose floor levels may be above, below, or in substantially the same plane as the surface of a loading and unloading platform, comprising a substantially vertically arranged and fixed frame adapted to rest adjacent the bottom of said platform and to be secured thereto; a fixed base supporting member constituting a lower section of said frame; a vertically arranged screw swivelly carried by said supporting member; a vertically reciprocable ramp structure including an upper portion, a lower portion and downwardly extending members rigidly connecting said portions, said lower portion engaging said screw for adjustably supporting said ramp structure, the upper portion of said structure being adapted to be substantially flush with the upper surface of said platform when said ramp structure is in its lowermost position and the lower portion of said structure being engageable with and cooperatively associated with the bottom of said screw when said upper portion is in said position; said upper ramp portion comprising hinged ramp plates connected laterally of said upper portion of said structure, one of said plates being adapted to rest flush on said platform surface when said structure is in its lowermost position, and angularly thereto when in raised position; and the other of said plates being adapted to rest upon the floor of said truck in either position as well as on said truck floor in said lowermost position when said floor is below the surface of said platform.

2. A ramp apparatus as defined in claim 1, and further characterized in that said bottom portion of said structure comprises a threaded block adapted to cause said ramp structure to be raised and lowered when said screw is turned.

3. A ramp apparatus as defined in claim 1, and further characterized in that said upper portion of said structure comprises a cross-head pivotally carrying said plates.

4. A ramp apparatus as defined in claim 1, and further characterized in that the top of said structure comprises a cross-head, the bottom of said structure comprising a threaded block, and said downwardly extending members comprising spaced-apart substantially vertical plates connecting said block and cross-head to hold the latter in upraised position as well as in flush position with respect to said platform.

5. A ramp apparatus as defined in claim 1, and further characterized in that said frame and said ramp structure respectively include complementary guide members adapted to maintain said structure in vertical alignment during raising and lowering thereof.

RALPH W. EYCLESHIMER.

References Cited in the file of this patent

UNITED STATES PATENTS

| Number | Name | Date |
| --- | --- | --- |
| 770,652 | Posey | Sept. 20, 1904 |
| 1,232,437 | Simpson | July 3, 1917 |
| 1,358,951 | Helmich | Nov. 16, 1920 |
| 1,905,947 | Morgan | Apr. 25, 1933 |
| 2,168,061 | Christie | Aug. 1, 1939 |
| 2,449,829 | Agren | Sept. 21, 1948 |